(12) United States Patent
Mitra

(10) Patent No.: US 7,412,701 B1
(45) Date of Patent: Aug. 12, 2008

(54) METHOD FOR NETWORK MANAGEMENT USING A VIRTUAL MACHINE IN A NETWORK DEVICE

(75) Inventor: Somnath Mitra, San Leandro, CA (US)

(73) Assignee: Cisco Technology, Inc., San Jose, CA (US)

( * ) Notice: Subject to any disclaimer, the term of this patent is extended or adjusted under 35 U.S.C. 154(b) by 713 days.

(21) Appl. No.: 10/127,961

(22) Filed: Apr. 22, 2002

(51) Int. Cl.
*G06F 9/455* (2006.01)
*G06F 9/445* (2006.01)
*G06F 15/173* (2006.01)

(52) U.S. Cl. .................. 718/1; 717/174; 717/175; 717/176; 709/223; 709/224

(58) Field of Classification Search ......... 709/223–226, 709/250, 238–248; 718/1; 717/168–178; 370/241, 254, 351–430, 465–467
See application file for complete search history.

(56) References Cited

U.S. PATENT DOCUMENTS

| | | | |
|---|---|---|---|
| 6,609,153 B1 * | 8/2003 | Salkewicz | 709/223 |
| 6,754,219 B1 * | 6/2004 | Cain et al. | 370/401 |
| 6,757,289 B1 * | 6/2004 | Cain et al. | 370/401 |
| 6,772,205 B1 * | 8/2004 | Lavian et al. | 709/223 |
| 6,810,427 B1 * | 10/2004 | Cain et al. | 709/238 |
| 6,826,550 B2 * | 11/2004 | Brown et al. | 706/15 |
| 6,970,902 B1 * | 11/2005 | Moon | 709/201 |
| 2002/0021701 A1 * | 2/2002 | Lavian et al. | 370/401 |

OTHER PUBLICATIONS

Landqvist, Magnus, "Porting and Evaluation of an Embedded Java Virtual Machine on Palm OS," Feb. 23, 2000, Department of Computer Science Lund Institute of Technology, pp. 1-31.*

Cisco Systems, et al., "Internetworking Technologies Handbook, Third Edition" (Indianapolis, IN: Cisco Press, 2001), Chap. 56, pp. 829-841.
M. Rose, "Concise MIB Definitions," IETF RFC 1212, Mar. 1991.
S. Waldbusser et al., "Host Resources MIB," IETF RFC 2790, Mar. 2000.

* cited by examiner

*Primary Examiner*—Thomas Lee
*Assistant Examiner*—Qing-Yuan Wu
(74) *Attorney, Agent, or Firm*—Hickman Palermo Truong & Becker LLP

(57) ABSTRACT

An approach for improving a network management system by using a virtual machine in a network device is described. Applets are created and downloaded to the network device via flash memory or trivial file transfer protocol ("TFTP"). A loader environment in the virtual machine loads the applet for execution. The virtual machine converts the applet into machine code and executes said applet in said network device. This approach is supported by porting a virtual machine that executes a high level operating language to an operating system in a network device is described. A build process is executed wherein makefiles of the operating system and virtual machine are modified. Modifying the operating system code comprises providing an entry point to the virtual machine by starting an operating system process using a command line interface ("CLI"), the CLI accepting the class file as a parameter to start the application, and terminating the operating system process for the virtual machine upon exit from the application. Further, modifying virtual machine code comprises transforming the virtual machine code to pertain to the operating system platform. Finally, a set of interfaces for users is provided. As a result, Java® applets, for example, may be executed in a router.

23 Claims, 4 Drawing Sheets

METHOD FOR NETWORK MANAGEMENT USING A VIRTUAL MACHINE IN A NETWORK DEVICE

FIELD OF INVENTION

The present invention relates generally to management of computer networks. The invention relates more specifically to a method for improving computer network management using a virtual machine in a network device.

BACKGROUND OF INVENTION

Computer networks have become ubiquitous in the home, office and industrial environment. Networks using packet routing and switching technology are widespread. As computer networks have grown more complex, automated mechanisms for organizing and managing networks have emerged. These mechanisms are generally implemented in the form of computer programs that are known as network management systems.

FIG. 1 is a simplified diagram of a network 100 that is managed by a network management station 200, within which the present invention may be used. The network 100 comprises one or more network devices 102, such as switches, routers, bridges, gateways and other devices. Each network device 102 is coupled to another network device 102 or to one or more end stations 120. Each end station 120 is a terminal node of the network 100 at which some type of work is carried out. For example, an end station is a workstation, a server or similar device.

Each network device 102 executes an operating system 110. An example of such an operating device is the Internetworking Operating System ("IOS") commercially available from Cisco Systems, Inc. of San Jose, Calif. Each network device 102 also executes one or more applications 112 under control of or embedded within the operating system 110. The operating system 110 supervises operation of the applications 112 and communicates over network connection 104 using an agreed-upon network communication protocol, such as Simple Network Management Protocol ("SNMP"). Typically, an SNMP agent within operating system 110 performs SNMP operations and responds to SNMP queries from external programs.

SNMP provides a systematic way of monitoring and managing a computer network and has become the standard in network management. SNMP facilitates exchange of management information between managed devices. Using data that is transported using SNMP, referred to as managed objects (such as packets per second and network error rates), users and application programs can more easily manage network performance, configure and provision network devices, find and solve network problems, and plan for network growth. A user with network management station 10, or applications running on station 10, can use SNMP to retrieve or modify information about the status or which is part of the configuration of the network device.

SNMP is defined in multiple versions known as Version 1 (abbreviated herein as "SNMPv1"); Version 2 ("SNMPv2"); Community-based SNMP Version 2 ("SNMPv2c"); and Version 3 ("SNMPv3"). All the versions share the same basic structure, components and architecture. In general, information in an SNMP-enabled device is stored in the form of a plurality of managed objects that are arranged in an object tree. Each object has one or more corresponding object instances, each of which has a unique object identifier ("OID"). Values of object instances are stored in tables in device memory; the names of the tables correspond to the names of the managed objects. Network management stations also track the names of tables and their corresponding OIDs in anticipation of the time when they will issue requests for such OIDs to the SNMP-enabled device.

Many networks contain components manufactured by several different companies. In order for the management station to communicate effectively with these various devices, the nature of the information maintained by the agents must be rigidly specified. SNMP therefore describes the exact information each agent must maintain and the format in which it must be maintained in data structures called management information bases ("MIBs").

Each device 102 stores its current configuration, and other information, in a management information base 114. Information in the MIB 114 is organized in one or more tables of one or more MIB variables. The network management station 10 can send fetch and set commands to the device 102 to retrieve or set values of MIB variables. Examples of MIB variables include SysObjID or SysOID. A description of SNMP, MIBs and the type of MIB information that may be supported by a device is described in Ford, et al., "Internetworking Technologies Handbook" (Indianapolis, Ind.: Cisco Press, 2001), Chapter 56, and Perkins et al., "Understanding SNMP MIBs", ISBN 0-13-437708-7.

Network management based on these open standards of SNMP needs customization for specific routers. Part of the information is present in standard MIBs published by standards bodies such as the IETF (e.g., RFCs 1212, 2790, etc). Many objects not covered in generic specifications (standard MIBs) are covered by vendor specific enterprise MIBs. Objects covered by these MIBs (standard and enterprise) may have complex relationships that are difficult to encapsulate with SNMP. A simple example is re-ordering various tables conveying the same data but indexed on different variables. A change to one cannot be conveyed to another using SNMPv2. More complex cause-fate relationships cannot be encapsulated as well.

Thus, a fundamental limitation of SNMP is that it provides no language to process cause-fate relationships other than in elaborate descriptions, thereby leaving it up to human implementers to implement the relationships. These implementations fall outside the scope of SNMP specifications.

Further, the customization of enterprise MIBs has to follow a formal process, and hence it is time-consuming. If a new set of counters is needed to monitor a specific aspect of a router, the turnaround time for those who review and approve MIB organization is at least in the order of weeks.

SNMP event notification uses traps to unilaterally notify changes. Regular polling has to be initiated by SNMP manager and is done on a regular basis. However, there is no easy mechanism under SNMP to setup a periodic update from the router (SNMP agent) to the SNMP manager.

In addition, simple tasks such as configuring voice classes of service, etc., which are relatively static, can easily be provided by SNMP. However, parameter values relating to dynamically managed configurations, such as class-based resource reservation setup protocol ("RSVP"), or resource aggregation (based on the time of day, call profile based on geographic location, etc.), are not easy to encapsulate in SNMP MIBs.

JAVA™ is an object-oriented programming language and environment developed by Sun Microsystems, Inc. Java allows for the creation of abstract classes known as interfaces, which allow a program to define methods that may be shared with several classes without regard for how other classes are handling the methods. Java provides a mechanism to distribute software and extends the capabilities of programmers to write an applet once and run it on any Java-enabled machine. Java can transport objects, use programming to encapsulate complex cause-fate relationships among objects and program threads for periodic updates.

A virtual machine, such as the Java Virtual Machine ("JVM") commercially available by Sun Microsystems, Inc., is a virtual software element that resides only in memory. Code for many flavors of the JVM (called "KVM", "CVM", "Embedded Java", etc.) is available for porting to various platforms. A virtual machine allows applications written in a specific programming language to be portable across different hardware environments and operating systems. To enable a Java application to execute on different types of data processing systems, a compiler typically generates an architecture-neutral file format—the compiled code is executable on many processors, given the presence of the Java run-time system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to produce, when executed, the same results on every JVM irrespective of the underlying CPU or architecture, and are translated on the fly into native machine code.

"Native code" refers to computer programs and instructions that are designed to be directly executed by computers using a specific computer architecture. For example, "68000" code is a type of native code that is designed for execution on systems using Motorola 68000 series microprocessors, and "SPARC" code is a type of native code that is designed for execution on computer systems using Sun Microsystems' SPARC series microprocessors. Java bytecode programs, by way of contrast, are computer architecture neutral in that they can be executed on any computer system that has a Java virtual machine.

The virtual machine mediates between the application and the underlying platform, converting the applications' bytecodes into machine-level code appropriate for the hardware and operating system being used. In addition to governing the execution of an application's bytecodes, the virtual machine handles related tasks such as managing the system's memory, providing security against malicious code and managing multiple threads of program execution.

However, despite its versatility, Java is not useful for real-time applications. The JVM includes an instruction that allocates memory for a new object, but includes no instruction for freeing that memory. The JVM is responsible for deciding whether and when to free memory occupied by objects that are no longer referenced by the running application. Usually, the JVM uses a garbage collector thread to automatically retain the memory used by objects that are no longer referenced by the running application. However, due to the non-real time nature of its garbage collector, Java is not considered suitable for real time applications.

Based on the foregoing, there is a clear need to provide improved management of network devices by enabling dynamic configuration of networks.

In particular, there is a need for a simplified way to configure dynamically managed network protocols and parameters, such as class-based RSVP resource aggregation based on time of day or call profile based on geographic location.

There is also a need for an application that is more adaptable to a network management system based on inherent programmability, in order to display real-time data such as call monitoring statistics.

There is a need for a method to reduce management traffic over the network by downloading simple management tasks to the network device in the form of applets written in high-level source language. Examples of such management include periodic updates from the device, consolidation of event logs and user specific control and monitoring tasks not involving internal device functions.

Based on the above needs, there is also a need to open a set of interfaces to an operating system to users in a well-known programming language.

Finally, there is a need to combine the real time control of an operating system with the flexibility of a high level source language, such as Java, for distributed computing for improved management of network systems.

SUMMARY OF THE INVENTION

The foregoing needs, and other needs and objects that will become apparent for the following description, are achieved in the present invention, which comprises in one aspect, a method for network management system using a virtual machine in a network device. A network device such as a router, switch, gateway, etc., is provided with a virtual machine integrated into the operating system of the network device. The virtual machine receives, parses and executes programmatic requests for network device information that are expressed in a high-level language, which may be the same language used to implement a requesting application. Thus, the network device forms a part of a distributed computing system that includes the requesting application.

Interface methods enable access to standard MIB data. One or more class libraries provide programmatic access to data maintained by the operating system. Thus, by invoking a method associated with desired operating system data, an application program can gain access to internal operating system objects. As a result, an application program can carry out numerous useful functions. For example, real-time call monitoring statistics can be displayed; modification of network objects can be performed; management traffic over the network is reduced; and graphical user interfaces may be introduced for certain functions.

In one embodiment, a Java virtual machine is ported to and integrated with a network device operating system, such as Cisco's Internetworking Operating System (IOS). A process of porting a virtual machine that executes a high level programming language to an operating system in a network device is described. Features of this aspect include executing a build process, modifying code of said operating system and modifying code of said virtual machine.

During the build process, makefiles of the operating system and virtual machine are modified. Modifying the operating system code comprises providing an entry point to the virtual machine by starting an operating system process using a command line interface ("CLI"), the CLI accepting the class file as a parameter to start the application, and terminating the operating system process for the virtual machine upon exit from the application. Finally, modifying virtual machine code comprises transforming the virtual machine code to pertain to the operating system platform.

In another aspect, a method of providing a set of interfaces for users is provided. Applets are created and downloaded to the network device via flash memory or trivial file transfer protocol ("TFTP"). A loader environment in the virtual machine loads the applet for execution. The virtual machine converts the applet into machine code and executes said applet in said network device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method for network management system using a virtual machine in a network device is described. In addition, a method for improving a network management system by porting a virtual machine that executes a high level language to an operating system in a network device is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview of Network Device with Virtual Machine
   1.1 Structural Overview
   1.2 Functional Overview
2.0 Process of Porting a Virtual Machine to a Network Device
   2.1 Selecting a Virtual Machine
   2.2 Porting the Virtual Machine
   2.3 Providing New Operating System Interfaces
3.0 Hardware Overview 1.0 Overview of Network Device with Virtual Machine
   1.1 Structural Overview According to an embodiment, a network management system is improved by porting a virtual machine that executes a high level language to an operating system in a network device.

Figure 1:
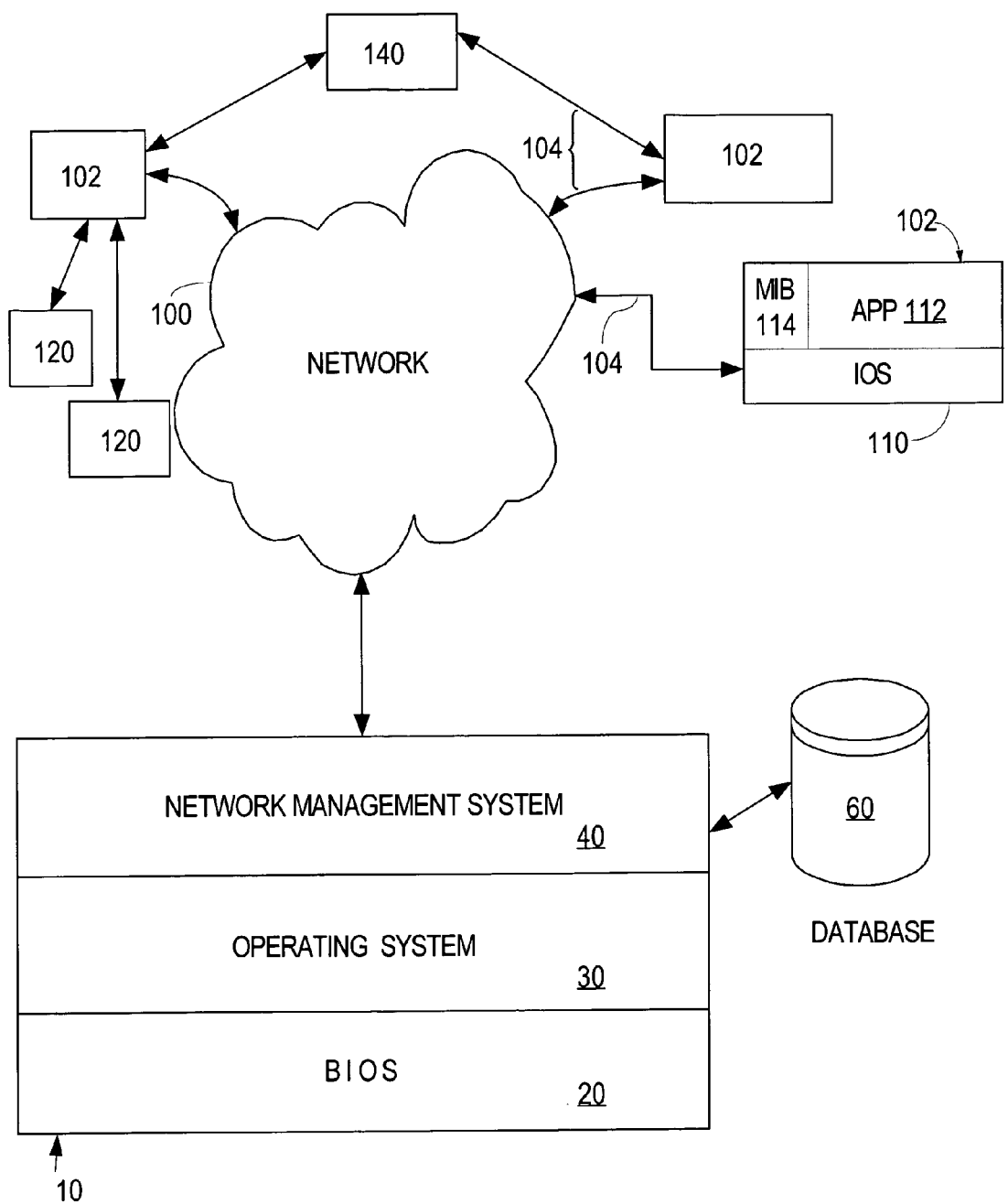
FIG. 1 is a simplified diagram of a network that is managed by a network management system.
Figure 2:
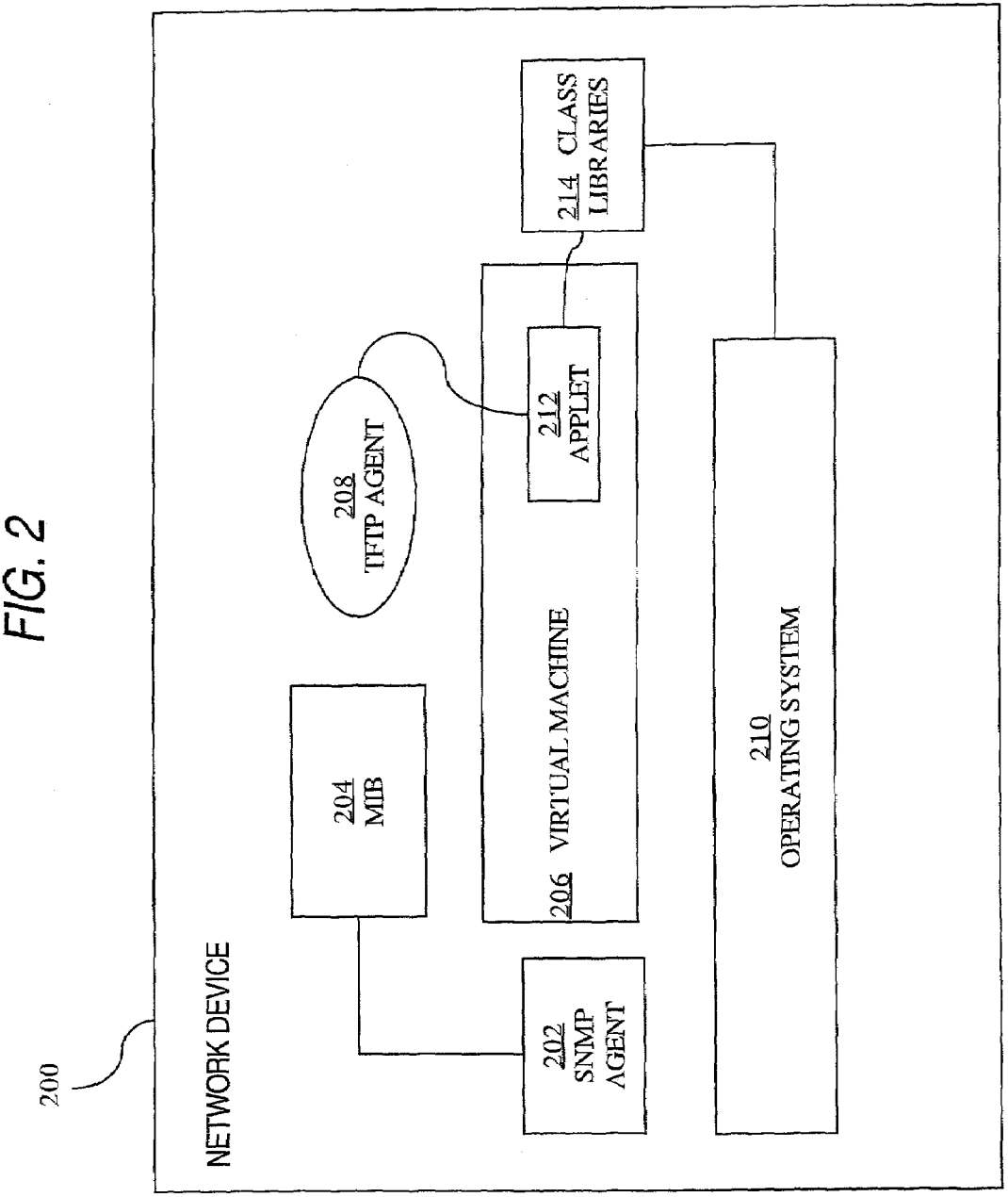
FIG. 2 is a block diagram of a network device that features a virtual machine that has been ported to interoperate with an internetworking operating system of the network device.

FIG. 2 is a block diagram of a network device that features a virtual machine. The network device 200 executes an operating system 210. In one embodiment, operating system 210 is Cisco IOS. Network device 200 also comprises an SNMP agent 202 that is communicatively coupled to operating system 210, and one or more associated management information bases (MIBs) 204. Each MIB 204 is organized as a hierarchical tree data structure that contains device information. SNMP agent 202 uses SNMP commands to carry out information exchange operations, such as a GET command to retrieve information from a MIB, a SET command that places data into a MIB variable, etc.

A virtual machine 206 is executed logically on top of operating system 210. A download channel utilizing a TFTP agent 208 is used to download one or more applets 212 to the virtual machine 206. Each applet is written in a high level language that is executable by virtual machine 206. For example, Java applets or applications may be used. Each applet typically H performs one or more functions, including but not limited to, monitoring network data traffic or automatically configuring the network router. Each applet is transferred to and executed by the virtual machine.

Virtual machine 206 further is communicatively coupled to one or more class libraries 214, which are written and stored for specific operating system functions. Examples of functions that can be carried out by class libraries 214 include call detail record ("CDR") processing, voice call processing and network policy management.

1.2 Functional Overview

Figure 3:
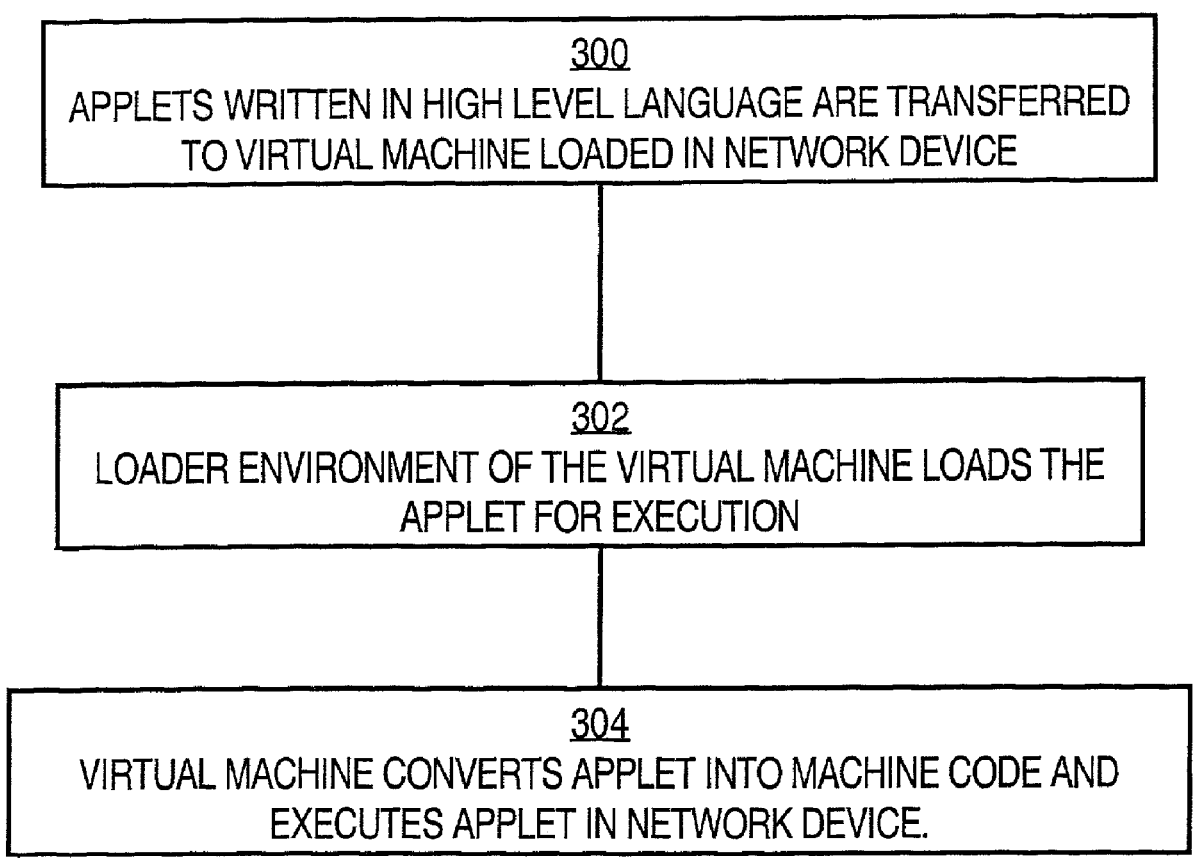
FIG. 3 is a flow diagram illustrating the steps of executing applets using a virtual machine in a network device.

Using the structure described above with respect to FIG. 2, programs for performing network management functions may be downloaded to a network device and executed using the virtual machine in the network device. In one embodiment, the programs are applets. FIG. 3 is a flow diagram illustrating the steps of executing applets using a virtual machine in a network device.

In block 300 of FIG. 3, applets written in high-level language are transferred to a virtual machine loaded in a network device. For example, one or more Java applets may be transferred to the virtual machine. Transfer may occur by writing the applets to flash memory in the router or by trivial file transfer protocol ("TFTP").

In block 302, a loader environment of the virtual machine loads the applet for execution. The loader environment moves the applet from flash memory to main memory, for example.

In block 304, the virtual machine converts the applet code into machine code and executes said applet in said network device. For example, a Java bytecode interpreter of the virtual machine transforms Java bytecode of the applet into machine code that the CPU of the network device can directly execute.

Using these processes, a variety of user tasks and management applications may be expressed in a high-level programming language that is executable by a virtual machine, and usefully performed by a router or similar network device. In particular, user tasks and management applications may perform dynamic management of network protocols and parameters, such as class-based RSVP resource aggregation based on time of day or call profile based on geographic location. Applications can display real-time data (for example, via web browsers) such as call monitoring statistics, taking advantage of the fact that they are executed at the network device with immediate access to such data, synchronized to the system clock of the network device.

Further, management applications may include periodic updates from the device, consolidation of event logs and user specific control and monitoring tasks not involving internal device functions, thereby reducing management traffic over the network. This is a crucial issue because when a router is at a critical state before the onset of a failure, it generates numerous alarms and warnings. Using centralized SNMP manager would exacerbate the failure condition.

2.0 Process of Porting a Virtual Machine to a Network Device

A process of porting a virtual machine to a network device is now described.

2.1 Selecting a Virtual Machine

An initial step is selecting which virtual machine to port to the network device and its operating system. When selecting a version of virtual machine to port to an operating system in a network device, there are important considerations. First, the amount of network device memory occupied by the ported virtual machine during operation must be small. For example, in one embodiment that is implemented in the Cisco 1700 Series routers, complete memory occupied by code and data is approximately 1 megabyte (MB).

In addition, it is desirable to impose a load on the CPU of the network device from running the virtual machine of less than about 2%. Because most users drive the CPU to approximately 90% load, having an extra feature for less than 2% will avoid 100% CPU usage. Preferably, the virtual machine is configured to support multiple process threads and Remote Method Invocation (RMI).

It is also desirable for the virtual machine to support an interface to C language program code. Such support enables the virtual machine to interface with C language interfaces that are provided by the operating system. This support may be provided by a native interface, such as Java Native Interface ("JNI"). However, a strict adherence to JNI is not necessary.

The virtual machine should provide support for performing memory garbage collection without interrupting other operating system activities. In one embodiment, a dynamic class loader is not supported, because the operating system may not maintain a symbol table of available symbols. Hence, all symbols are resolved at build time. Finally, no user interface, such as AWT or Swing, is needed, because a router does not provide any direct user interface.

Many virtual machine implementations of the Java 2 specifications are in existence today. "KVM", commercially available from Sun Microsystems, Inc., may be used. KVM is a highly optimized JVM specifically designed for resource-constrained consumer devices. The executable form of the KVM machine is small (approximately 50K bytes in size after optimizations) and efficient, ensuring optimal performance in devices such as low-end cell phones and pagers. KVM, like all Java virtual machines, provides services for downloading and execution of dynamic content and services.

Other beneficial characteristics of use of KVM include that
1. the source code is available for free, although any commercial use must be licensed from Sun;
2. the code conforms to J2ME CLDC specifications as described in the folder http://java.sun.com/products/cldc/, and
3. the code occupies approximately 100 kilobytes (KB) of memory.

2.1 Porting the Virtual Machine

The following steps were taken to port the KVM (a variant of JVM) to Cisco IOS.

2.1.1 Build Process. A Build Process Involving the Following Steps was Carried Out.
1. The IOS makefile was modified to start a build (using make) of the KVM.
2. The IOS makefile was modified to add the object produced by the KVM.
3. The KVM makefile was modified to build a relocatable image. This was necessary because the final link and resolution of all symbols was done by IOS make. Since IOS does not retain a symbol table, all symbols including those for the C language interface to IOS should be resolved at build time.
4. For KVM, the build platform was chosen to be Solaris and target platform was C1700. The platform of C1700 enabled MPC860.

2.1.2 IOS Code Changes. Certain Changes in IOS Program Code were Made, as Follows.
1. An entry point was provided to KVM. This is done by starting a process for the JVM using a CLI.
2. The CLI accepts the name of a class file as a parameter to start that application.
3. Multiple invocations of the JVM are possible. This is necessary to start different applications.
4. KVM is started by StartJVM with the class file name.
5. Upon exit from the application, the IOS process for the JVM is terminated to conserve system resources.

2.1.3 KVM CODE CHANGES. Certain changes were made to the source code of the KVM, as follows.

VmCommon:
1. Setjmp and longjmp code was modified to suit the CPU of the platform MPC860.
2. KVM inflate function was renamed to kvm_inflate in order to prevent a conflict with an IOS function having the same name.
3. All code using Unix style file system code was modified to use IOS style file system calls.
   a. The FILE pointer based access was changed to FILE descriptor based access.
   b. Since the parameter profile of the functions did not match, some modifications were needed to change from Unix style calls to IOS file system calls.
   c. NULL File pointer was changed to use the File Descriptor value of −1.

VmExtra:
1. Various include files were changed to pertain to the IOS platform instead of Solaris.
2. Many functions, such as network access, were moved to VmIOS.

VmIOS:
1. All socket calls in KVM were transformed to IOS style socket calls as follows:

| KVM/Unix | IOS functions |
| --- | --- |
| Socket(a, b, c) | socket_open(a, b, c) |
| Bind | socket_bind |
| Accept | socket_accept |
| connect(a, b, c) | socket connect(a, b, c) |
| Recv | socket_recv |
| Send | socket_send |
| recvfrom | socket_recvfrom |
| Sendto | socket_sendto |
| Soclose | socket_close |
| Closesocket | socket_close |
| listen | socket_listen |
| Setsockopt | socket_set_option |
| sock_errno | socket_errno |
| Select | socket_select |
| Getsockname | socket_get_localname |
| inet_network | socket_inet_network |
| inet_ntoa | socket_inet_ntoa |
| inet_addr | socket_inet_addr |
| gethostbyname | socket_gethostbyname |

2. The Alter function was modified to be IOS specific. Since the GUI has been deleted, the only recourse was to allow console-based notification.
3. Functions related to initialization, etc. of native code were stubbed out because IOS native code needs no initialization. IOS starts the JVM, not vice-versa.
4. The concept of current time is important to JVM for task scheduling. Therefore, an interface to provide the exact system clock time, as maintained by IOS, was created.

5. A concept of the current date is also needed by JVM. This was provided by obtaining the current time.

Java Runtime:

1. Dynamic class loading was prevented because IOS does not have the concept of loading C libraries and resolving symbols at runtime. IOS does not retain symbol tables for the runtime image.
2. Debugging code was not included as part of the build. Hence, the debug agent was disabled.
3. Since IOS is a run to completion OS (no preemption of tasks is possible), it is possible for Java code to retain control of the CPU indefinitely. To eliminate this result, the process checks for other, higher-priority IOS processes wishing to regain control after execution of every four (4) bytecodes. If other processes are ready, control passes to them. The number four may be increased if other profiling data supports it. This method also means that regardless of the number of JVM tasks running or the number of Java threads running within a JVM, high-priority IOS processes never lose control.
4. The JVM has access to a central Java Object Table, which has been linked into the IOS image as a C language data structure. The central object table has been optimized for space rather than search speed, because the router requires a small footprint JVM. The object table contains code references to all C language code that is addressable as Java class libraries (outlined later in this document). Thus, access to IOS native code is only possible via this central object table (not via JNI).
5. The Java Object Table for class libraries is created, for example, using a KVM tool called Java Code Compact. A few modifications have been made to it to allow a smaller object table.

Miscellaneous

1. All fprintf code was merged into a single form of printf via console port.
2. Putchar was transformed to printc function call.
3. Various conflicts related to signed/unsigned char/integer were resolved.

2.3 Providing New Operating System Interfaces

According to an embodiment, a set of interfaces for third party users is provided. Porting a virtual machine and custom class libraries for internal object access allows for easier modification of network objects and reduction of management traffic of management tasks if they can be downloaded to the router as Java applets.

In one embodiment, the interfaces provide a complete complement of what is provided by SNMP. Alternatively, a subset is provided. The following set of classes represents a subset of SNMP functions, and the classes are presented herein in conceptual groupings. Many classes have been modeled after SNMP MIBs. The functions of most methods are apparent from the names of the methods.

Voice and Call Control

The VoiceDialPeer class provides the following methods:
GetSessionTarget: A string, which is of the form "mapping-type:type-specific-syntax." The mapping-type is loopback/ipv4/ipv6. For loop back, the type specific syntax is compressed/uncompressed. For ipv4/ipv6 it is a valid IP address.
GetDialDigitsPrefix: A string showing the dial digits prefix.
SetDialDigitsPrefix: Sets the prefix of the dialed digits.
GetDIDEnable: Returns the DID state of the peer.
SetDIDEnable: Sets the DID state of the peer.
GetSessionProtocol: The protocol used could be Cisco, H323, SIP or MGCP.
GetIpPrecedence: Get IP Precedence value (between 0 and 7 inclusive) to be stored in the IP header of the packets.
SetIpPrecedence: Set IP Precedence value (between 0 and 7 inclusive) to be stored in the IP header of the packets.

The VoiceCall class provides the following methods:
GetCallActiveConnectionId: A globally unique identifier for the call.
GetCallActiveTxDuration: Time in ms the call was on from this router.
GetCallActiveVoiceTxDuration: Time in ms voice was transmitted for this call.
GetCallActiveCoderTypeRate: The negotiated transmission rate for this call.
GetCallActiveNoiseLevel: The noise level in dBm for this call.
GetCallActiveOutSignalLevel: The active signal level used for this call.
GetCallActiveERLLevel: The Echo Return Loss level of this call.
GetCallActiveCallingName: The name of the calling party as a string.
GetCallActiveCallerIDBlock: Returns true if caller ID is blocked for this call.

The VoiceCallActive class provides the following methods:
GetVoiceCallActiveConnectionId: A globally unique ID for this call.
GetVoiceCallActiveRemoteIPAddress: Remote IP address for this call.
GetVoiceCallActiveRemoteUDPPort: The remote UDP port for this call.
GetVoiceCallActiveRoundTripDelay: Round trip delay of voice packet in ms during the call.
GetVoiceCallActiveSelectedQoS: The selected RSVP QoS for this call.
GetVoiceCallActiveSessionTarget: The selected target from dial peer used for the call.
GetVoiceCallActiveHiWaterPlayoutDelay: The high water mark of voice FIFO play out delay in ms.
GetVoiceCallActiveLoWaterPlayoutDelay: The low water mark of voice FIFO play out delay in ms.
GetVoiceCallActiveReceiveDelay: The average voice FIFO play out delay in ms.
GetVoiceCallActiveCoderTypeRate: The negotiated coder rate for voice call.

Hardware Interfaces

The FXSVoiceInterface class provides the following methods:
GetSignalType: Loop or Ground Start
SetSignalType: Loop or Ground Start
GetRingFrequency: a number between 1 and 100 representing frequency in Hz.
SetRingFrequency: a number between 1 and 100 representing frequency in Hz.

The FXOVoiceInterface class provides the following methods:
GetSignalType: Loop or Ground Start
SetSignalType: Loop or Ground Start
GetNumRingAnswer: Number of rings before closing loop.
SetNumRingAnswer: Number of rings before closing loop.

The EMVoiceInterface class provides the following methods:
GetSignalType: Loop or Ground Start
SetSignalType: Loop or Ground Start GetInterfaceType: the type of E&M like Type 1, 2, 3, 4 or 5.

GetWireType: 2-wire or 4-wire.

The AnalogVoiceInterface class provides the following methods:

GetImpedance: An enumeration of the impedance value in Ohms and Real or Complex type.

SetImpedance: Sets the impedance of the port.

The EtherInterface class provides the following methods for the Ethernet interfaces:

GetInterfaceStats: Returns an object containing statistics on Alignment errors, collisions, late collisions, etc.

GetMacAddress: returns the 48-bit MAC address.

GetDuplexType: returns whether the interface is full or half duplex.

The SerialInterface class provides the following methods for Ethernet interfaces:

GetInterfaceSpeed: The clock/bit rate of the serial interface.

SetInterfaceSpeed: The clock/bit rate of the serial interface.

GetInterfaceEncoding: The line encoding of the bits on the interface.

SetInterfaceEncoding: The line encoding of the bits on the interface.

RSVP

This class provides information related to the use of RSVP and has the following methods:

GetRsvpSessionNumber
GetRsvpSessionType
GetRsvpSessionEntry
GetRsvpEncap
GetRsvpRefreshInterval
StartRsvpSession
EndRsvpSession
SetRsvpEncap
SetRsvpRefreshInterval
SetRsvpSessionNumber
SetRsvpSessionParameters Diagnostics This set of classes provides information about the health of the router. In the event of an impending disaster, the Java class takes evasive action to pre-empt disaster. The class has the following methods:

GetMemorySize: returns the size of the DRAM present in the system.

GetMemoryPools
GetMemoryPoolType
GetMemoryPoolName
GetMemoryPoolUsedBytes
GetMemoryPoolFreeBytes GetCPUBusy: return an integer between 0 and 100 inclusive representing the percentage of time the CPU is busy.

GetNumIOSProcesses

GetIOSversion: returns a string containing the version information.

Other classes that implement other SNMP functions may be provided in other embodiments. All these classes are compiled into native IOS code by the Java CodeCompact tool identified above.

3.0 Hardware Overview

Figure 4:
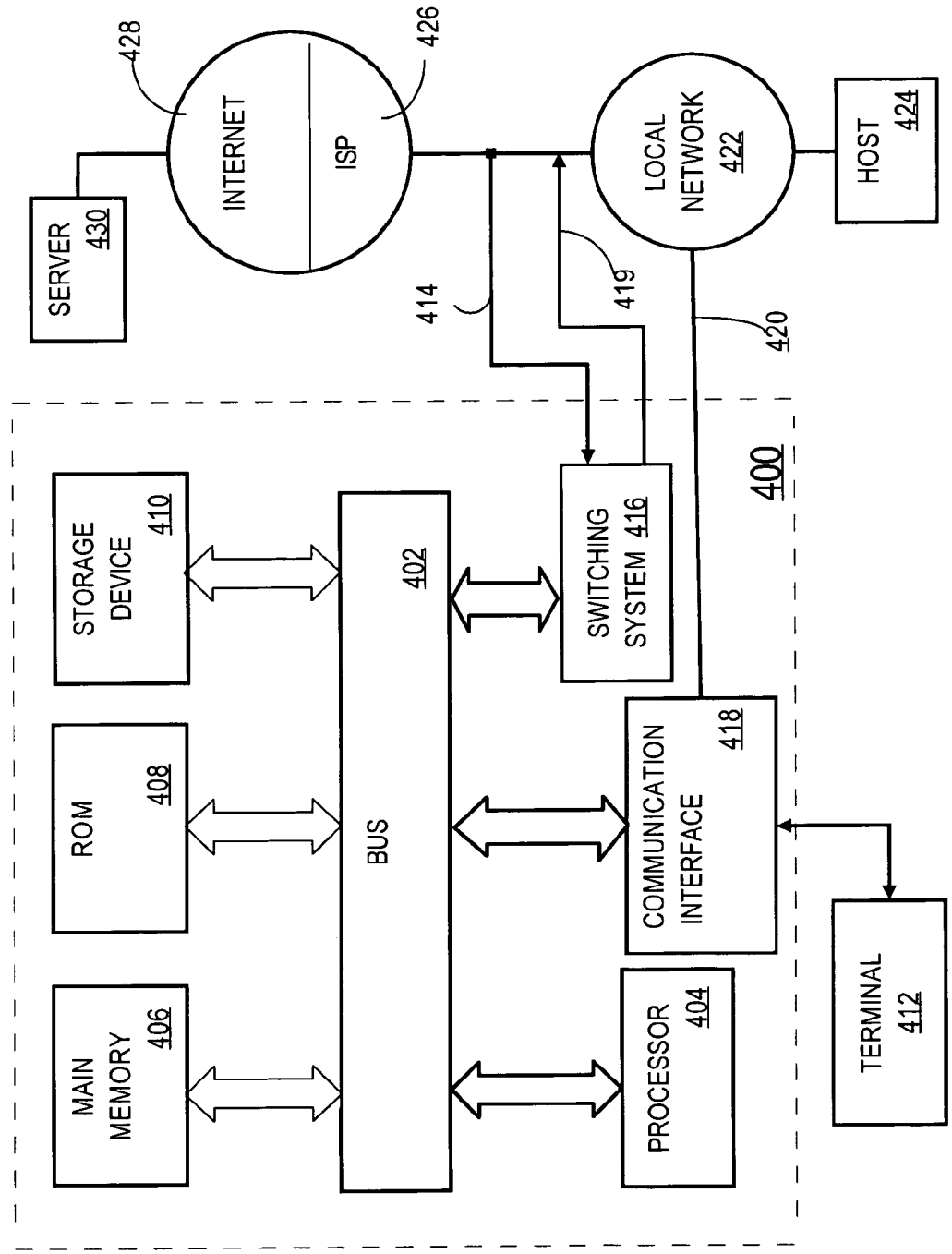
FIG. 4 is a block diagram of a computer system on which aspects of the invention may be implemented.

FIG. 4 is a block diagram that illustrates a computer system 400 upon which an embodiment of the invention may be implemented.

Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. However, it will be evident that various modifications and changes may be made thereto without departing from the broader spirit and scope of the invention. The specification and drawings are, accordingly, to be regarded in an illustrative rather than a restrictive sense.

What is claimed is:

1. A method of performing network management operations using a virtual machine that executes a high-level programming language and is hosted by a network routing device, the method comprising the computer-implemented steps of:
    receiving one or more applets expressed in the high-level programming language at the network routing device;
    loading the one or more applets for execution;
    converting the one or more applets into one or more sets of machine code;
    executing the sets of machine code in the network device, wherein executing the sets of machine code provides immediate access to real-time data of the device, performs dynamic management of network protocols, and displays the real-time data synchronized to a system clock of the network routing device;
    consolidating event logs, user specific control tasks, and user specific monitoring tasks at the network routing device, and providing periodic updates from the network routing device; and
    providing the virtual machine in the network routing device by executing a build process of an operating system, wherein the build process performs a build of the virtual machine.

2. The method according to claim 1 wherein said network routing device is a router in a packet-switched data network.

3. The method according to claim 1, wherein the step of receiving one or more applets comprises the steps of downloading one or more Java applets.

4. The method according to claim 1 wherein the step of receiving one or more applets comprises the steps of transferring said applets to the virtual machine via router flash memory.

5. The method according to claim 1 wherein the step of receiving one or more applets comprises the steps of transferring said applets to the virtual machine via trivial file transfer protocol.

6. The method according to claim 1 wherein the step of loading the one or more applets for execution comprises the steps of loading the one or more applets into a loader environment of the virtual machine.

7. A computer-readable storage medium storing one or more sequences of instructions for improving a network management system by performing network management operations using a virtual machine that executes a high-level programming language and is hosted by a network routing device, which instructions, when executed by one or more processors, cause the one or more processors to carry out the steps of:
    receiving one or more applets expressed in the high-level programming language at the network routing device;
    loading the one or more applets for execution;
    converting the one or more applets into one or more sets of machine code;
    executing the sets of machine code in the network device, wherein executing the sets of machine code provides immediate access to real-time data of the device, performs dynamic management of network protocols, and displays the real-time data synchronized to a system clock of the network routing device;
    consolidating event logs, user specific control tasks, and user specific monitoring tasks at the network routing device, and providing periodic updates from the network routing device; and
    providing the virtual machine in the network routing device by executing a build process of an operating system, wherein the build process performs a build of the virtual machine.

8. The computer-readable storage medium according to claim 7 wherein said network routing device is a router in a packet-switched data network.

9. The computer-readable storage medium according to claim 7, wherein the instructions for receiving one or more applets comprise instructions which when executed cause downloading one or more Java applets.

10. The computer-readable storage medium according to claim 7 wherein the instructions for receiving one or more applets comprise instructions which when executed cause transferring said applets to the virtual machine via router flash memory.

11. The computer-readable storage medium according to claim 7 wherein the instructions for receiving one or more applets comprise instructions which when executed cause transferring said applets to the virtual machine via trivial file transfer protocol.

12. The computer-readable storage medium according to claim 7 wherein the instructions for loading the one or more applets for execution comprise instructions which when executed cause loading the one or more applets into a loader environment of the virtual machine.

13. A network routing device for performing network management operations using a virtual machine that executes a high-level programming language, the network routing device comprising:

means for receiving one or more applets expressed in the high-level programming language at the network routing device;

means for loading the one or more applets for execution;

means for converting the one or more applets into one or more sets of machine code;

means for executing the sets of machine code in the network device, wherein the means for executing the sets of machine code provides immediate access to real-time data of the device, performs dynamic management of network protocols, and displays the real-time data synchronized to a system clock of the network routing device;

means for consolidating event logs, user specific control tasks, and user specific monitoring tasks at the network routing device, and for providing periodic updates from the network routing device; and means for providing the virtual machine in the network routing device by executing a build process of an operating system, wherein the build process performs a build of the virtual machine.

14. The network routing device of claim 13, wherein said network routing device is a router in a packet-switched data network.

15. The network routing device of claim 13, wherein the means receiving the one or more applets comprise means for downloading one or more Java applets.

16. The network routing device of claim 13, wherein the means for receiving the one or more applets comprise means for transferring said applets to the virtual machine via router flash memory.

17. The network routing device of claim 13, wherein the means for receiving one or more applets comprise means for transferring said applets to the virtual machine via trivial file transfer protocol.

18. A network routing device for performing network management operations using a virtual machine that executes a high-level programming language, the network routing device comprising:

one or more processors; and a memory comprising one or more stored sequences of instructions which, when executed by the one or more processors, cause the one or more processors to perform steps comprising:

receiving one or more applets expressed in the high-level programming language at the network routing device;

loading the one or more applets for execution;

converting the one or more applets into one or more sets of machine code;

executing the sets of machine code in the network device, wherein executing the sets of machine code provides immediate access to real-time data of the device, performs dynamic management of network protocols, and displays the real-time data synchronized to a system clock of the network routing device;

consolidating event logs, user specific control tasks, and user specific monitoring tasks at the network routing device, and providing periodic updates from the network routing device; and providing the virtual machine in the network routing device by executing a build process of an operating system, wherein the build process performs a build of the virtual machine.

19. The network routing device of claim 18, wherein said network routing device is a router in a packet-switched data network.

20. The network routing device of claim 18, wherein the instructions for receiving one or more applets comprise instructions which when executed cause downloading one or more Java applets.

21. The network routing device of claim 18, wherein the instructions for receiving one or more applets comprise instructions which when executed cause transferring said applets to the virtual machine via router flash memory.

22. The network routing device of claim 18, wherein the instructions for receiving one or more applets comprise instructions which when executed cause transferring said applets to the virtual machine via trivial file transfer protocol.

23. The network routing device of claim 18, wherein the instructions for loading the one or more applets for execution comprise instructions which when executed cause loading the one or more applets into a loader environment of the virtual machine.

* * * * *